US007109887B2

(12) United States Patent
Lu et al.

(10) Patent No.: US 7,109,887 B2
(45) Date of Patent: Sep. 19, 2006

(54) VEHICLE DETECTOR SYSTEM WITH AUTOMATIC LOOP CHECKING

(75) Inventors: Jason Zhen-yu Lu, Sparks, NV (US); Benjamin Luke, Sparks, NV (US); Allen Jacobs, Reno, NV (US)

(73) Assignee: Reno A&E, Reno, NV (US)

( * ) Notice: Subject to any disclaimer, the term of this patent is extended or adjusted under 35 U.S.C. 154(b) by 0 days.

(21) Appl. No.: 10/719,315

(22) Filed: Nov. 20, 2003

(65) Prior Publication Data

US 2005/0110658 A1 May 26, 2005

(51) Int. Cl.
*B60Q 1/48* (2006.01)

(52) U.S. Cl. ...................... 340/933; 340/935; 340/941; 324/654; 324/243

(58) Field of Classification Search ................ 340/933, 340/935, 938, 941, 551, 552, 514, 540, 539.24; 324/654, 243; 702/183
See application file for complete search history.

(56) References Cited

U.S. PATENT DOCUMENTS

| | | | | |
|---|---|---|---|---|
| 4,201,908 | A * | 5/1980 | Johnson et al. | 377/9 |
| 5,621,661 | A * | 4/1997 | Farrow | 340/941 |
| 5,777,893 | A * | 7/1998 | Farrow et al. | 702/183 |

* cited by examiner m

*Primary Examiner*—Davetta W. Goins

(57) ABSTRACT

A method and apparatus for automatically testing the integrity of an inductive loop in a vehicle detector system. A check loop is placed adjacent each inductive loop in a multi-channel vehicle detector system. Each check loop is periodically activated by the vehicle detector to simulate a vehicle load on the associated inductive loop. Samples representing loop inductance at different activation periods are compared with a standard. When the result exceeds the standard, the inductive loop is subjected to additional sample testing with decreasing time intervals between sampling. After a number of additional samples exceed the standard, the inductive loop is deemed failed.

8 Claims, 2 Drawing Sheets

VEHICLE DETECTOR SYSTEM WITH AUTOMATIC LOOP CHECKING

BACKGROUND OF THE INVENTION

This invention relates to vehicle detectors used to detect the presence or absence of a motor vehicle in an inductive loop mb dded in a roadbed. More particularly, this invention relates to a vehicle detector with an automatic loop checking capability.

Vehicle detectors have been used for a substantial period of time to generate information specifying the presence or absence of a vehicle at a particular location. Such detectors have been used at intersections, for example, to supply information used to control the operation of the traffic signal heads; have been used in railway installations for railway car detection and control; and have also been used to supply control information used in conjunction with automatic entrance and exit gates in parking lots, garages and buildings.

A widely used type of vehicle detector employs the principle of period shift measurement in order to determine the presence or absence of a vehicle in or adjacent the inductive loop mounted on or in a roadbed. In such systems, a first oscillator, which typically operates in the range from about 10 to about 120 kHz is used to produce a periodic signal in a vehicle detector loop. A second oscillator operating at a much higher frequency is commonly used to generate a sample count signal over a selectable, fixed number of loop cycles. The relatively high frequency count signal is typically used to increment a counter, which stores a number corresponding to the sample count at the end of the fixed number of loop cycles. This sample count is compared with a reference count stored in another counter and representative of a previous count in order to determine whether a vehicle has entered or departed the region of the loop in the time period between the previous sample count and the present sample count.

The initial reference value is obtained from one or more initial sample counts and stored in a reference counter. Thereafter, successive sample counts are obtained on a periodic basis, and compared with the reference count. If the two values are essentially equal, the condition of the loop remains unchanged, i.e., a vehicle has not entered or departed the loop. However, if the two numbers differ by at least a threshold amount in a first direction (termed the Call direction), the condition of the loop has changed and may signify that a vehicle has entered the loop. More specifically, in a system in which the sample count has decreased and the sample count has a numerical value less than the reference count by at least a threshold magnitude, this change signifies that the period of the loop signal has decreased (since fewer counts were accumulated during the fixed number of loop cycles), which in turn indicates that the frequency of the loop signal has increased, usually due to the presence of a vehicle in or near the loop. When these conditions exist, the vehicle detector generates a signal termed a Call Signal indicating the presence of a vehicle in the loop.

Correspondingly, if the difference between a sample count and the reference count is greater than a second threshold amount, this condition indicates that a vehicle which was formerly located in or near the loop has left the vicinity. When this condition occurs, a previously generated Call Signal is dropped.

The Call signals generated by a vehicle detector are used in a number of ways. Firstly, the Call signals are presented to an output terminal of the vehicle detector and forwarded to various types of traffic signal supervisory equipment for use in a variety of ways, depending on the system application. In addition, the Call signals are used locally to drive a visual indicator, typically a discrete light emitting diode (LED) or a multiple LED display or a liquid crystal display (LCD) to indicate the Call status of the vehicle detector, i.e. whether or not the vehicle detector is currently generating a Call signal.

Vehicle detectors with the Call signal generating capability described above are used in a wide variety of applications, including vehicle counting along a roadway or through a parking entrance or exit, vehicle speed between preselected points along a roadway, vehicle presence at an intersection controlled by a traffic control light system, or in a parking stall, in railroad yards, and numerous other applications.

In all applications, proper operation of the basic vehicle detector is entirely dependent upon the integrity of the loop to which the vehicle detector is connected and which is an integral part of the loop oscillator circuit. If the loop is electrically open or shorted the loop oscillator circuit cannot function in a predictable manner, and the sample counts obtained over the measurement periods will be totally inaccurate. As a direct consequence, the vehicle detector can not function in its required reliable manner. Although a vehicle detector loop is carefully checked immediately after installation in situ to ensure loop integrity, loop failure may occur anytime thereafter due to the severe environmental conditions within which such loops are expected to operate. More specifically, such loops are regularly subject to extreme temperature fluctuations (both short term and long term), and mechanical abrasions, and may be the object of random acts of vandalism or other destructive forces. Consequently, prudent maintenance of a vehicle detector system usually includes some provision for checking the integrity of the vehicle detector loop. In the past, such loop checks have required that a skilled maintenance technician visit the loop site and manually perform appropriate mechanical and electrical tests. When a defective loop is revealed by this procedure, the technician will either repair the mechanical or electrical problem or disable the vehicle detector until suitable repairs can be made. Before the advent of the instant invention these maintenance procedures have been considered to be necessary and unavoidable, even though such manual inspection and test routines are costly and time consuming, and thus relatively undesirable. More importantly, however, manual inspection and test maintenance is a relatively inefficient approach to the problem of loop maintenance due to the random nature of loop failures: in any given loop installation, the loop can fail mechanically or electrically moments after a service technician has checked and verified the mechanical and electrical integrity of a vehicle detector loop. Efforts in the past to provide vehicle detector systems devoid of the above disadvantages have not met with success.

SUMMARY OF THE INVENTION

The invention comprises a vehicle detector system with automatic loop checking which repeatedly checks the integrity of the vehicle detector loop on a periodic basis and, in case of a suspected defect, performs additional tests to verify the defect and executes appropriate control and supervisory functions based on the outcome of the tests.

From an apparatus standpoint the invention comprises a vehicle detector having circuitry powered by a source of electrical power for sensing changes in an associated inductive loop related to the presence of a vehicle in the vicinity of the loop and for generating a Call signal in response to such changes; and means for automatically performing a loop check for the associated inductive loop. The means for automatically performing a loop check includes a check loop and switch means for selectively coupling said check loop to the vehicle detector. The means for automatically performing a loop check also includes means for displaying the result of a loop check.

When incorporated in a multi-channel vehicle detector having circuitry for generating Call signals for each channel the means for automatically performing a loop check includes means for performing a loop check on each channel.

The means for automatically performing a loop check preferably includes additional testing circuitry for performing an iterative loop integrity test on a loop which failed the loop check.

From a process standpoint the invention comprises a method of testing the integrity of an inductive loop in a vehicle detector system; the method including the steps of periodically activating a check loop adjacent the inductive loop to simulate a vehicle load, and comparing values representative of inductive loop inductance values measured during different activation periods of the check loop with a preselected value to determine the integrity of the inductive loop. The method may further include additional iterative testing once an initial comparison has indicated that the inductive loop lacks integrity. This additional iterative testing is conducted at periodic intervals of diminishing magnitude and is continued upon successive failures up to a maximum number, after which proof of the inductive loop failure is determined to be conclusive.

Vehicle detectors incorporating the invention eliminate the need for on site checking of vehicle detector loop integrity by a service technician. More importantly, the invention affords a virtually constant real time checking of loop integrity and appropriate automatic immediate supervisorial action until a detected loop defect can be repaired.

For a fuller understanding of the nature and advantages of the invention, reference should be had to the ensuing detailed description taken in conjunction with the accompanying drawings.

DETAILED DESCRIPTION OF THE PREFERRED EMBODIMENTS

Figure 1:
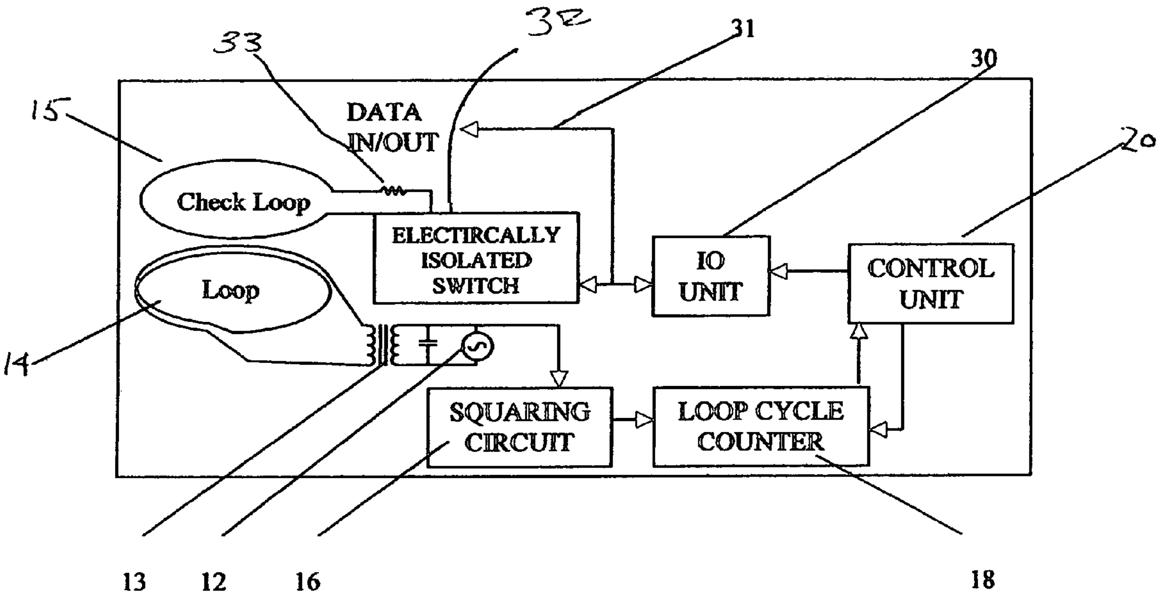
FIG. 1 is a block diagram of a vehicle detector incorporating the invention.

Turning now to the drawings, FIG. 1 is a block diagram of a vehicle detector incorporating the invention. As seen in this figure, an oscillator 12 operable over a frequency range of about 10 to about 120 kHz is coupled via a transformer 13 to an inductive loop 14. Inductive loop 14 is typically mounted within the roadbed in a position such that vehicles to be sensed will pass over the loop. Such loops are well-known and are normally found installed at controlled locations in the highway system, such as at intersections having signal heads controlled by a local intersection unit, parking lots with controlled mounted adjacent a track switch in a railway system.

The oscillator circuit 12 is coupled via a squaring circuit 16 to a loop cycle counter 18. Loop cycle counter 18 typically comprises a multi-stage binary counter having a control input for receiving appropriate control signals from a control unit 20 and a status output terminal for providing appropriate status signals to the control unit 20, in the manner described below.

Control unit 20 includes a second oscillator circuit which typically generates a precise, crystal controlled, relatively high frequency clock signal (e.g., a 6 mHz clock signal). This high frequency clock signal is coupled via a second squaring circuit to a second binary counter, both of which are also included in control unit 20. The second binary counter is typically a multi-stage counter having a control input for receiving control signals generated within control unit 20 and a count state output for generating signals representative of the count state of counter at any given time. The count state of the second binary counter is coupled as one input to an arithmetic logic unit included within control unit 20. The other input to the arithmetic logic unit is one or more reference values stored in a reference memory within control unit 20. The reference memory is controlled by appropriate signals generated within control unit 20 in the manner described below.

An input/output unit 30 is coupled between the control unit 20 and externally associated circuitry via control signal path 31. I/O unit 30 accepts appropriate control signals via signal path 31 to specify the control parameters for the vehicle detector unit of FIG. 1, such as mode, sensitivity, and any special features desired. I/O unit 30 furnishes data output signals via signal path 31, the data output signals typically comprising Call signals indicating the arrival or departure of a vehicle from the vicinity of the associated loop and other display signals.

Initially, control unit 20 supplies control signals to loop cycle counter 18 which define the length of a sample period for the high frequency counting circuit comprising the elements noted above. For example, if control unit 20 specifies a sample period of six loop cycles, loop cycle counter 18 is set to a value of six and, when the sample period is to commence, control unit 20 permits loop cycle counter 18 to begin counting down from the value of six in response to the leading edge of each loop cycle signal furnished via squaring circuit 16 from loop oscillator circuit 12. Contemporaneously with the beginning of the countdown of the loop cycle counter 18, control unit 20 enables the internal high frequency counter to accumulate counts in response to the high frequency signals received from the internal high frequency oscillator circuit via the second squaring circuit. At the end of the sample period (i.e., when the loop cycle counter has been counted down to zero), control unit 20 generates a disable signal for the high frequency counter to freeze the value accumulated therein during the sample period. Thereafter, this sample count value is transferred to the internal ALU and compared with the value stored in the reference memory, all under control of control unit 20. After the comparison has been made, the sample process is repeated.

The reference value in the reference memory is a value representative of the inductance of the loop oscillator circuit comprising elements 12–16 at some point in time. The reference is updated at the end of certain periods in response to certain comparisons involving the reference stored in the reference memory and successively obtained samples from the internal counter. Whenever the difference between a given sample from the internal counter and the reference from the reference memory exceeds a first threshold value in the Call direction, the control unit 20 senses this condition and causes the generation of an output signal—termed a Call signal—on signal path 31 indicating the arrival of a vehicle within the loop vicinity. Similarly, when the difference between a given sample and the previous reference exceeds a second threshold in the No Call direction the control unit 20 senses this condition and causes the Call output signal on signal path 31 to be dropped. In the preferred embodiment, the Call direction is negative and the Call direction threshold value is −8 counts; while the No Call threshold value is −5 counts.

Power is supplied to the system elements depicted in FIG. 1 from a dedicated power supply (not shown) via appropriate power conductors. The power supply typically provides DC voltage to the electronic circuit components comprising the vehicle detector, and is usually powered by either AC or DC electrical power available at the installation site of the vehicle detector.

Figure 2:
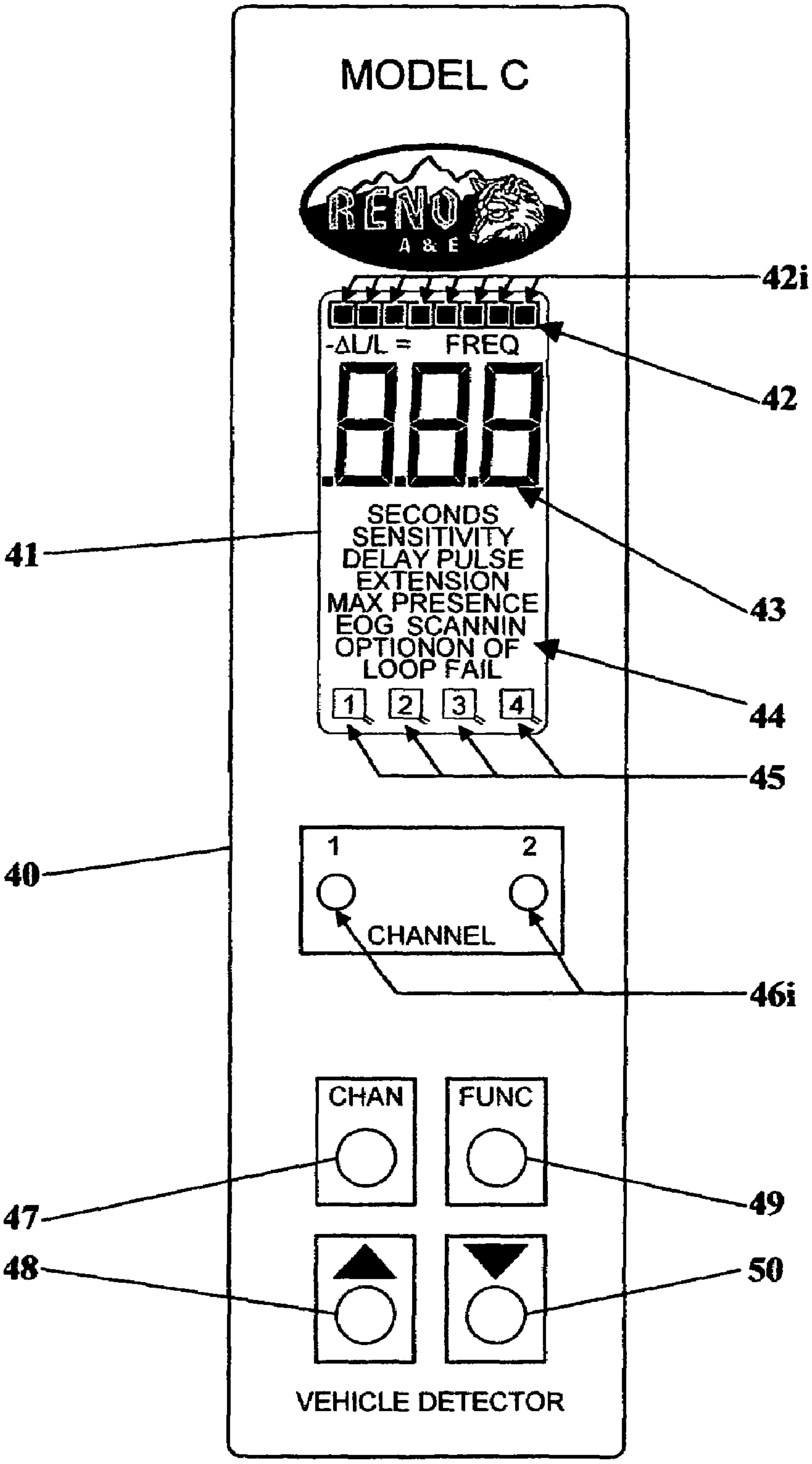
FIG. 2 is a is a front view showing the display unit of the vehicle detector.

Call signal path 31 is coupled to a user interface 40 shown in FIG. 2. As seen in this FIG., the user interface includes a multi-purpose display 41, preferably an LCD display having four separate portions 42–45. The first portion 42 is a horizontal row of individually activatable bar segments **42*i*, where i is the total number of bar segments. Second portion 43 comprises three characters, each having seven segments, capable of displaying numbers and letters. Third portion 44 comprises several individually activatable permanent legends (e.g.“SECONDS”, “SENSITIVITY”, “DELAY”, “PULSE”, etc). Fourth portion 45 comprises a plurality of individually activatable loop symbols equal in number to the number of channels incorporated into the vehicle detector. The loop symbols are numbered to designate the associated channel. Positioned below display 41 are a number of LED visible indicators 46*i*, where i represents the number of LED indicators. In the example shown in FIG. 2, i=2. Each Led indicator 46*i* is associated to a different vehicle detector channel and is used to indicate the status of one or more channel parameters or modes of operation, such as the CALL parameter, loop failure parameter, delay time mode of operation, and extension time mode of operation. Below indicators 46*i* are four momentary contact manually operable switches 47–50 which are used in a variety of ways to select parameters, set parameter values, select modes of operation, select channels to be displayed and affected by parameter selection and value setting, and reset the vehicle detector. Those operations of user interface 40** relevant to the invention are described in detail below.

Returning to FIG. 1, a separate loop 15 is coupled to I/O unit 30 via an electrically isolated switch 32. Loop 15 is termed a check loop and is periodically activated to check the electrical and physical integrity of street loop 14 by simulating a vehicle positioned over street loop 14. Check loop 15 is preferably a single turn loop of conductive wire placed in close proximity to street loop 14. Check loop 15 can be formed independently from street loop 14, or may comprise an extra turn of street loop 14 which is severed from street loop 14 during installation of street loop 14 in the roadbed.

Switch 32 may comprise any one of a number of electrically operable isolation switches, such as an electro-mechanical relay, capable of being operated by a low level D.C. control signal.

In order to optimize the magnitude of the load imposed on street loop 14 by check loop 15, a resistor 33 is coupled in series with the check loop 15. The value of resistor 33 can be empirically selected by those of ordinary skill in the art.

The check loop operation is activated by operation of the switches 47–50 to select a loop channel for which the check loop option is active, and to set the check loop timer parameter value for that loop channel. One or more loop channels may be selected by repeating this process.

When the check loop feature is not activated, switch 32 remains open and check loop 15 is not used. When the check loop feature is activated, switch 32 is periodically closed at a rate initially determined by the check loop timer parameter value previously entered by the user so that check loop 15 causes a loading effect on street loop 14 that simulates the passage of a large vehicle over street loop 14. The change in frequency caused by this simulation is measured by the vehicle detector and is used to determine whether the street loop 14 is functioning properly.

More specifically, when the check loop feature is selected for one or more loop channels, the vehicle detector acquires an initial check loop sample value for each selected loop channel by connecting check loop 15 and taking an initial sample count for each loop channel. Thereafter, the vehicle detector starts the check loop timers and proceeds to conduct normal sampling operations for each loop channel When a check loop timer has timed out and the conventional sampling process for that channel has been completed, check loop 15 is activated by closing switch 32. At the beginning of the next sample period for that loop channel, the vehicle detector acquires a check loop sample and compares the new sample with the previous check loop sample. If the difference between the current sample and the previous sample is less than or equal to a preselected value-in the preferred embodiment 0.04% Delta L/L (where L is the loop inductance)-the loop is determined to be functioning properly and the check loop timer for that loop channel is reset to start another time out period. In addition, the legend “PAS” is displayed in portion 43 of display 41 (if that loop channel is currently selected for viewing by the previous operation of switches 47–50)

If the check loop difference is greater than the preselected value by a maximum threshold amount—+/−25% Delta L/L in the preferred embodiment—the loop is considered to be inoperational (either shorted or open), and the check loop operation is suppressed for that loop channel.

If the check loop difference lies between the preselected value and the maximum threshold amount, this is judged as an initial failure of the check loop test and the legend “Fcl” is displayed in portion 43 of display 41 (if that loop channel is currently selected for viewing by the previous operation of switches 47–50). Once an initial failure has been determined, an iterative test routine commences for that loop channel. Upon commencement, the legend “Pcl” is displayed in portion 43 of display 41 (if that loop channel is currently selected for viewing by the previous operation of switches 47–50), and the vehicle detector proceeds by waiting a predetermined period of time (ten seconds in the preferred embodiment) and performing another loop check test. If the result indicates that the check loop sample difference is equal to or lies below the preselected value, the iterative test routine is aborted and the normal loop check routine is re-entered. However, if the check loop sample difference is still greater than the preselected value, the iterative test routine is continued, but the waiting period between samples is shortened by a predetermined amount (to nine seconds in the preferred embodiment—a one second difference). This iterative test routine continues for each failure, with the waiting period between samples being reduced by some amount until a preselected number of consecutive failures has occurred. If this eventuates, the loop is judged to have permanently failed and this failure is noted by setting a latch and displaying the legend "Lcl".

As will now be apparent to those skilled in the art, vehicle detectors provided with the invention avoid the necessity for on site checking of vehicle detector loop integrity by a service technician, and thus reduce maintenance costs for such equipment. Perhaps more importantly, the invention provides dynamic testing of vehicle detector loop integrity without the need for human intervention.

Although the above provides a full and complete disclosure of the preferred embodiments of the invention, various modifications, alternate constructions and equivalents will occur to those skilled in the art. For example, different iterative additional test routines using variable time intervals may be chosen for the implementation of the invention, if desired. Therefore, the above should not be construed as limiting the invention, which is defined by the appended claims.

What is claimed is:

1. In a vehicle detector having circuitry powered by a source of electrical power for sensing changes in an associated inductive loop related to the presence of a vehicle in the vicinity of the loop and for generating a Call signal in response to such changes; the improvement comprising means for automatically performing a loop check for the associated inductive loop, said means for automatically performing a loop check including a separate check loop located adjacent said inductive loop and switch means for selectively coupling said check loop to said vehicle detector, said vehicle detector including means for periodically activating said switch means to couple said check loop to said vehicle detector, means for activating said check loop to simulate a vehicle load on said inductive loop when said check loop is coupled to said vehicle detector, and means for determining the inductance value of said inductive loop when said check loop is activated, said means for automatically performing a loop check including additional testing circuitry for performing an iterative loop integrity test on an inductive loop, said additional circuitry including means for determining an initial loop check failure, means for establishing a maximum number of iterative loop checks, timer means for establishing the time between successive iterative loop checks, means for enabling said iterative loop integrity test after said initial loop check failure, fail means for determining whether said inductive loop fails a given iterative loop check, and iterative loop check stop means for terminating said iterative loop integrity test when said fail means determines that said inductive loop failed said maximum number of successive loop checks.

2. The invention of claim 1 wherein said vehicle detector is a multi channel detector having circuitry for generating Call signals for each channel; and wherein said means for automatically performing a loop check includes means for performing a loop check on each said channel.

3. The invention of claim 1 wherein said means for automatically performing a loop check includes means for displaying the result of a loop check.

4. The invention of claim 1 wherein said iterative loop check stop means further includes means for terminating said iterative loop integrity test when said fail means determines that said inductive loop did not fail one of said successive loop checks.

5. The invention of claim 1 wherein said timer means includes means for varying the time between successive iterative loop checks.

6. A method of testing the integrity of an inductive loop in a vehicle detector system; the method including the steps of periodically activating a check loop positioned adjacent the inductive loop to simulate a vehicle load on the inductive loop, comparing values representative of inductive loop inductance values measured during different activation periods of the check loop with a threshold value to determine the integrity of the inductive loop, etermining an initial inductive loop failure when a measured inductive loop inductance value exceeds the threshold value, and performing an iterative inductive loop integrity test when an initial inductive loop failure is determined, said step of performing an iterative inductive loop integrity test including the steps of:

(a) establishing a maximum number of iterative inductive loop checks;

(b) establishing the time between successive iterative inductive loop checks: and (c) performing successive iterative inductive loop checks by (i)activating the check loop, (ii)measuring the inductance of the inductive loop and (iii) comparing the measured inductance with the threshold value until the inductive loop has either failed the maximum number of iterative inductive loop checks or the inductive loop has not failed one of the iterative inductive loop checks.

7. The method of claim 6 wherein said step (b) of establishing includes the step of varying the time between successive iterative inductive loop checks.

8. The method of claim 7 wherein the time between successive iterative inductive loop checks is decreased after each loop check.

* * * * *